(12) United States Patent
Marsay et al.

(10) Patent No.: US 12,510,445 B2
(45) Date of Patent: Dec. 30, 2025

(54) PARTICULATE COLLECTION SYSTEM AND METHOD

(71) Applicant: KROMEK LIMITED

(72) Inventors: Stuart James Marsay, Durham (GB); John Thomas Atkins, Durham (GB); Simon Kenelmn Walker, Durham (GB); Eva Vitova, Durham (GB)

(73) Assignee: KROMEK LIMITED

( * ) Notice: Subject to any disclaimer, the term of this patent is extended or adjusted under 35 U.S.C. 154(b) by 638 days.

(21) Appl. No.: 17/909,130

(22) PCT Filed: Mar. 8, 2021

(86) PCT No.: PCT/GB2021/050575
§ 371 (c)(1),
(2) Date: Sep. 2, 2022

(87) PCT Pub. No.: WO2021/176238
PCT Pub. Date: Sep. 10, 2021

(65) Prior Publication Data
US 2023/0160788 A1   May 25, 2023

(30) Foreign Application Priority Data

Mar. 6, 2020 (GB) .................................... 2003303
Apr. 30, 2020 (GB) .................................... 2006429
Feb. 18, 2021 (GB) .................................... 2102289

(51) Int. Cl.
*G01N 1/22* (2006.01)
(52) U.S. Cl.
CPC ......... *G01N 1/2208* (2013.01); *G01N 1/2205* (2013.01)

(58) Field of Classification Search
CPC ........................... G01N 1/2208; G01N 1/2205
See application file for complete search history.

(56) References Cited

U.S. PATENT DOCUMENTS 2,696,275 A * 12/1954 Pring ..................... B01D 45/12
                                                   261/DIG. 54
3,948,779 A *  4/1976 Jackson ................. B01D 33/23
                                                   210/331

(Continued)

OTHER PUBLICATIONS

ISA/EP, European Patent Office, International Search Report, Apr. 29, 2021, 13 pages, European Patent Office.

*Primary Examiner* — Tarun Sinha
(74) *Attorney, Agent, or Firm* — FERENCE & ASSOCIATES LLC

(57) ABSTRACT

A particle concentrator system for the concentration of particulate material is described. The particle concentrator system comprises a prefilter module comprising a first inertial classifier configured to retain a flow in which particles smaller than a predetermined cut point size tend to segregate differentially; and a concentrator module comprising at least one second inertial classifier, and optionally more than one fluidly in series, configured to retain a flow in which particles larger than a predetermined cut point size tend to segregate differentially. The inertial classifiers are preferably virtual impactors. A gas sampler system, a gas sampler, concentrator and collection system, a method for the collection of a sample of aerosolised particulate material using such systems are also described.

20 Claims, 8 Drawing Sheets

(56) References Cited

U.S. PATENT DOCUMENTS

| | | |
|---|---|---|
| 4,670,135 A | 6/1987 | Marple et al. |
| 5,040,424 A | 8/1991 | Marple et al. |
| 5,932,795 A | 8/1999 | Koutrakis et al. |
| 6,120,573 A | 9/2000 | Call et al. |
| 6,402,817 B1 | 6/2002 | Bergman |
| 2006/0257287 A1* | 11/2006 | Call ............ G01N 1/2208 422/83 |
| 2010/0242632 A1* | 9/2010 | Call ............ B07B 7/00 73/863.22 |
| 2011/0203931 A1 | 8/2011 | Novosselov et al. |
| 2012/0247233 A1 | 10/2012 | Maheshwari et al. |

* cited by examiner

| WIND SPEED (m/s) | MASS FLOW RATE (Kg/s) SCOOP | | | | | |
|---|---|---|---|---|---|---|
| | 1 | 2 | 3 | 4 | 5 | 6 |
| 0 | 0.0154 | 0.0154 | 0.0153 | 0.0152 | 0.0152 | 0.0153 |
| 2 | 0.0155 | 0.0132 | 0.0132 | 0.0153 | 0.0167 | 0.0168 |
| 4 | 0.0158 | 0.0116 | 0.0114 | 0.0157 | 0.0155 | 0.0188 |
| 7 | 0.0178 | 0.0077 | 0.0092 | 0.0177 | 0.0120 | 0.0203 |
| 8 | 0.0188 | 0.0067 | 0.0088 | 0.0185 | 0.0102 | 0.0201 |
| 14 | 0.0253 | -0.0030 | 0.0091 | 0.0225 | -0.0042 | 0.0186 |

PARTICULATE COLLECTION SYSTEM AND METHOD

The present application is a National Phase Entry of PCT International Application No. PCT/GB2021/050575, which was filed on Mar. 8, 2021, and which claims priority to Application No. 2003303.1 filed in Great Britain on Mar. 6, 2020, Application No. 2006429.1 filed in Great Britain on Apr. 30, 2020, and Application No. 2102289.2 filed in Great Britain on Feb. 18, 2021, the contents of which are hereby incorporated by reference.

The invention relates to a system and method for the collection of airborne particulate material, for example from an air sample. The invention particularly concerns the concentration of airborne particulate material of a desired target size range within a sample. More complete embodiments or preferred applications of the invention further concern the collection of the sample into an aqueous buffer and the analysis of a collected sample, in particular in-line with the sampling stage and for example continuously. The invention finds particular applicability to the collection for analysis and optionally further the analysis of biological samples, and for example the collection of genetic material and optionally further the analysis of genetic material by sequencing.

INTRODUCTION

Sampling of particulates from a gas stream and in particular from air, for example for subsequent analysis, has a range of applications. These might include the detection of chemical or biological hazards, monitoring and/or control of particulate pollution, monitoring and/or control of airborne pathogens and the like.

Laboratory based technology for analysis of both chemical and biological particulate materials is relatively well established. For laboratory application, a batch processing methodology is typically followed where samples are collected in the field and sent to the laboratory for analysis. The efficient and effective collection of samples for subsequent analysis, and in particular the collection of sufficient concentrations of any target particulate for that subsequent analysis is always desirable.

Advantages can additionally accrue if the collection process and collection apparatus can be made portable, for example for deployment in distributed environments. Particular advantages can be envisaged if the collection apparatus can be deployed on a vehicle. This allows the ready collection of multiple samples from multiple locations.

Particular further advantages can accrue if the analysis process can be automated, and at least partly performed at that distributed location, and for example similarly deployed in a portable manner for example of a vehicle, or otherwise provided in line with the collection system. The effective collection and concentration of a sample by equipment adapted to be deployable into an environment to be sampled might be particularly important in relation to such in line analysis.

The invention may find particular applicability in relation to the collection and optionally further the analysis of biological samples, and in particular of biological pathogens, for example via analysis of genetic material by sequencing. As techniques for such analysis become more rapid, and more susceptible of miniaturisation, systems which provide for at least some in line analysis steps to be performed on a collected sample become more viable, and the development of systems and methods for the more effective and efficient collection of airborne and in particular aerosolised biological particulate material becomes particularly advantageous. The invention is discussed herein in particular with reference to the collection of such materials, particularly in the context of their collection for such subsequent analysis and optionally including at least some of the steps necessary for the subsequent analysis, but it will be appreciated that this is presented by way of example, and that the principles of the invention could readily be applied to other situations where it might be desired efficiently to collect and to concentrate samples of particulate material carried in and for example aerosolised in a gas flow, especially from an air sample.

SUMMARY OF INVENTION

In accordance with the invention in a most general first aspect, a particle concentrator system for the concentration of airborne and for example aerosolised particulate material comprises:

a prefilter module comprising a first inertial classifier configured to receive and inlet gas flow comprising particulate material and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at a desired maximum particle size;

a concentrator module comprising a second inertial classifier fluidly positioned to receive an inlet flow from the first outlet flow of the first inertial classifier and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at or below a desired minimum particle size; optionally at least one further inertial classifier, the or each such further inertial classifier successively fluidly positioned to receive an inlet flow from the second outlet flow of an immediately preceding inertial classifier and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at or below a desired minimum particle size; and an outlet to output the second outlet flow of the concentrator module (that is, the second outlet flow of the most downstream inertial classifier of the concentrator module).

More completely, a gas sampler system for the collection and concentration of airborne and for example aerosolised particulate material comprises:

a sampler inlet for example provided in a sampler inlet module to receive a gas flow comprising particulate material;

a prefilter module comprising a first inertial classifier fluidly positioned to receive an inlet flow from the sampler inlet and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at a desired maximum particle size;

a concentrator module comprising a second inertial classifier fluidly positioned to receive an inlet flow from the first outlet flow of the first inertial classifier and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at or below a desired minimum particle size; optionally at least one further inertial classifier, the or each such further inertial classifier successively fluidly positioned to receive an inlet flow from the second outlet flow of an immediately preceding inertial classifier fluidly positioned to receive an inlet flow from the second outlet flow of an immediately preceding inertial classifier and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at or below a desired minimum particle size; and an outlet to output the second outlet flow of the concentrator module (that is, the second outlet flow of the most downstream inertial classifier of the concentrator module).

Inertial classifiers for use in the invention, as will be familiar, are configured to divide an inlet flow into two outlet flows into which the particulate material segregates differentially by size. That is, they are configured to divide an inlet flow into a first outlet flow, usually a major outlet flow, into which smaller particles below a target cut point size tend to segregate differentially, and a second outlet flow, usually a minor outlet flow, into which larger particles above a target cut point size tend to segregate differentially.

The invention is distinctly characterised by the arrangement of multiple such inertial classifiers fluidly in series to perform both a large particle filtration function and a sample concentration function.

The first function is performed by the pre-filter module comprising a first inertial classifier, which is disposed such that the large particle outlet flow is discarded and the small particle outlet flow is retained for further processing.

The concentrator module has a further inertial classifier stage with at least a second inertial classifier and optionally at least one further inertial classifier stages which are disposed with the opposite arrangement. With appropriate selection of cut size these at further stage(s) can be used to concentrate the particles into a smaller volume.

Preferably, the concentrator module comprises at least two inertial classifiers fluidly in series. More preferably, the concentrator module comprises two or three inertial classifiers fluidly in series. More preferably, the concentrator module comprises exactly two inertial classifiers fluidly in series.

In this last case, the concentrator module comprises the said second inertial classifier fluidly positioned to receive an inlet flow from the first outlet flow of the first inertial classifier and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at or below a desired minimum particle size; and a third inertial classifier fluidly positioned to receive an inlet flow from the second outlet flow of the second inertial classifier and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at or below a desired minimum particle size; and an outlet to output the second outlet flow of the third inertial classifier.

Optionally, the invention may comprise a pre-filter module comprising a first inertial classifier stage and a concentrator module with at least a second inertial classifier stage and optionally at least one further inertial classifier stage, and optionally with at least two and for example two or three and for example exactly two inertial classifier stages fluidly in series, wherein each said stage may comprise multiple discrete fluidly parallel inertial classifiers.

As used herein in the general sense, an inertial classifier will be understood to be an apparatus used to separate particles by size into two air streams based on the differential inertia of the differently sized particles, in that they are configured to divide an inlet flow into a first outlet flow into which particles below a target size tend to segregate differentially, and a second outlet flow into which larger particles tend to segregate differentially. Often, one of the said flows is captured or discarded and the other, containing an increased proportion of particles of the desired size, is passed for onward processing.

Thus, as described herein, the concentrator system is the combination of a pre-filter module and a concentrator module. Each module comprises one or more inertial classifiers which differentiate larger and smaller particles into different floe paths.

The pre-filter module filters our larger particles by discarding the stream where the larger particles predominate and by passing the stream where the smaller particles predominate to the concentrator module. The concentrator module concentrates the gas stream by discarding the stream where the smaller particles predominate, which typically includes a major part of the gas flow. Each module may comprise one or more stages of inertial classifier fluidly in series. In embodiments, the pre-filter module has a single stage and the concentrator module at least two. Each module may comprise plural inertial classifiers fluidly in parallel.

Suitable inertial classifiers that produce the desired first outlet flow into which smaller particles tend to segregate differentially and a second outlet flow into which larger particles tend to segregate include physical and virtual impactors and cyclones.

As used herein in the general sense, impactors are inertial classifiers in which one of the flows is directed to a capture means and the particles entrained therein are captured by the capture means and the other flow and the particles entrained therein is output for example for onward processing. In physical impactors, the capture means is a physical impaction surface to which one of the flows is caused to be directed and by which the particles entrained therein are captured. Virtual impactors as will be familiar replace the impaction surface with a virtual space, for example comprising stagnant or slow moving air, that has fluidly equivalent function.

Virtual impactors are particularly preferred. Virtual impactors have a number of advantages in relation to the envisaged application. They tend to have relatively precise cut point characteristics, and so lend themselves effectively to the filter stage. They tend to have collection efficiency, and a relatively high major/minor flow differential, with the minor flow (the second flow as above described) typically constituting 5-20% of the total flow, and for example around 10%. Thus, a relatively small number of concentrator stages might be necessary, for example 2 or 3. Preferably, at least two, more preferably two or three, and more preferably exactly two concentrator stages are provided.

In preferred embodiments of the invention, each of the inertial classifiers comprises a virtual impactor.

That is, in accordance with the invention in such embodiments, a gas sampler system for the collection and concentration of airborne and for example aerosolised particulate material comprises:

optionally, a sampler inlet for example provided in a sampler inlet module to receive a gas flow comprising particulate material;

a prefilter module comprising a first virtual impactor configured to receive the gas flow comprising particulate material and for example fluidly positioned to receive an inlet flow, for example from the sampler inlet;

a concentrator module comprising a second virtual impactor fluidly positioned to receive an inlet flow from the first or major outlet flow of the first virtual impactor; optionally at least one further virtual impactor fluidly positioned to receive an inlet flow from the second or minor outlet flow of the second virtual impactor; and an outlet to output the minor outlet flow of the concentrator module.

More completely, in such embodiments, a gas sampler system for the collection and concentration of airborne and for example aerosolised particulate material comprises:

optionally, a sampler inlet to for example provided in a sampler inlet module receive a gas flow comprising particulate material;

a prefilter module comprising a first virtual impactor configured to receive the gas flow comprising particulate material and for example fluidly positioned to receive an inlet flow from the sampler inlet and configured to divide the inlet flow into a first, major outlet flow into which smaller particles tend to segregate differentially and a minor outlet flow into which larger particles tend to segregate differentially;

a concentrator module comprising a second virtual impactor fluidly positioned to receive an inlet flow from the first, major outlet flow of the first virtual impactor and configured to divide the inlet flow into a first, major outlet flow into which smaller particles tend to segregate differentially and a second, minor outlet flow into which larger particles tend to segregate differentially; optionally at least one further virtual impactor, each such further virtual impactor successively fluidly positioned to receive an inlet flow from the second, minor outlet flow of the immediately preceding virtual impactor and configured to divide the inlet flow into a first, major outlet flow into which smaller particles tend to segregate differentially and a second, minor outlet flow into which larger particles tend to segregate differentially; and an outlet to output the minor outlet flow of the most downstream impactor of the concentrator module.

Impactors have been used extensively, studied both theoretically and experimentally, and are the instrument of choice for the determination of aerosol or other particle mass size distributions.

The most common type of virtual impactor consists of a single particle acceleration nozzle and particle collection nozzle. The gas (in this case air) enters the nozzle which accelerates the airflow/particles. Particles larger than the cut point size enter the particle collection nozzle with the minor flow (for example 5 to 20% and typically about 10% of the total flow) while small particles tend to follow the streamlines of the major flow. A common design of this type of virtual impactor consists of a vertically disposed column or cone with a particle acceleration nozzle to the top and a particle collection nozzle to the bottom. In such a case, the successive virtual impactors making up the prefilter module and concentrator module may form a single vertical array. Examples given herein include discussion of such possible arrangements. However the invention is not limited to a particular design or geometry of inertial classifier such as virtual impactor or to a particular geometric or fluid arrangement of the modules.

The key to the invention is the provision, in fluid series, of a prefilter module comprising a first classifier and preferably a first virtual impactor as above described and a concentrator module comprising at least one and preferably at least two serially arranged further classifiers and preferably further virtual impactor as above described. Subject to that, any suitable design or geometry or fluid arrangement may be considered. In particular, vertical, horizontal, radial and more complex arrangements of the modules may be encompassed by the invention. In particular multiple modules may be provided fluidly in parallel. Complex geometries may be particularly desirable to meet the desire for compactness and portability.

A key advantage subsists in using the same technology for both modules and operations, (sizing particles and flow concentration). This is most cost effective as the design and manufacturing is in principle the same, subject only to suitable configuration to a desired predetermined cut point size being selected. This is a design feature comfortably within the competence of the skilled person when presented with the desired size.

Virtual impactors tend to have a relatively precise cut off at the desired cut point size. Thus in the preferred case successive virtual impactors are used, and the invention is discussed below by way of example on that basis. However, other classifiers may be used on the same principle.

The key to the invention is the particular arrangement of major and minor flow whereby the respective virtual impactors are used to perform both a large particle filtration function and a target particle concentration function.

The first classifier, being in the preferred case the first virtual impactor, has an appropriately selected cut point size to remove particles above a predetermined maximum target particle size. In a typical application the particle size range of interest may be for example be 0.25 µm to 25 µm, and for example 0.4 µm to 10 µm, the respirable range. To stop larger particles, a virtual impactor configured to remove particles over the target maximum size, for example with a cut point size of up to 25 µm and for example 10 µm is used, with particles of above this size passing into the minor flow and being discarded from the sample.

The cut point size is controlled to achieve this effect, to ensure that at least a major part and for example substantially all of the particles at and above the cut point size pass into the minor flow and exit the system through a coarse discharge. This cut point is controlled by the optimisation of process parameters using known principles. The particle size distribution which can be achieved varies according to classifier type and is dependent on the material being processed but in the envisaged applications and sizes can be generally well controlled, particularly in the preferred case when a virtual impactor is used.

An optional physical filter may additionally be used upstream of the prefilter module, for example as part of the gas sampler inlet, to remove even larger particles from the system altogether before they are drawn into the first virtual impactor. A suitable filter might include a wire mesh for example.

Suitable impeller means may be provided to draw air through the gas sampler inlet where present and into the prefilter module.

The major flow from the first virtual impactor, typically constituting 90% of the total flow, now predominantly contains particles below the upper limit target maximum size which have removed by the first virtual impactor.

This is then passed to the particle concentrator module which is again in the preferred embodiment based on the virtual impactor principle. In a preferred case plural stages, for example two to four stages, are used, and the successive minor flows are collected. The number of stages will be a compromise between various collection efficiency factors such as collection losses attributable to each stage and collection efficiency factors attributable to the major/minor flow ratio that is used to achieve concentration. An optimum major/minor flow ratio may be such that the minor flow constitutes 5 to 20% for example 8 to 12% and typically about 10% of the total flow.

For these virtual impactors, the retained air flow is the minor flow that includes all particles coarser than the cut point size. For these particles a cut point size is selected to be such that the target particles segregate into the minor flow, and is for example selected to be at or below a desired minimum particle size, which may for example be 0.25 μm and more preferably 0.4 μm. Thus, the impactor has or successive impactors of the concentrator module together co-operate to provide a final cut point size of 0.25 μm or more and for example 0.4 μm. Thus, in possible embodiments, the virtual impactors of the particle concentrator may conveniently have an additional function to filter out the very fine particles, but this is not a critical feature of the invention.

This cut point is controlled by the optimisation of process parameters using known design principles. Using virtual impactors relatively high collection efficiencies are possible, so that the minor flow from the successive stages of the concentrator retains a substantial proportion of particles in the target size range, preferably at least 90%, and optimally in excess of 95%, while significantly concentrating those particles relative to the volume of gas, for example in that the minor flow from each stage is 5 to 20% for example 8 to 12% and typically about 10% of the total flow. A concentration factor of 100 or more is thereby achievable with two or three stages.

It should be understood that the description of virtual formations performing successive function/successive method steps, and in particular the reference to prefilter and concentrator modules/functions may be held to imply that the invention requires that both functions are performed but not necessarily that they are performed in physically discrete structures or as temporally entirely separated process steps. A single compound module adapted to include both stages and perform both steps closely successively or effectively simultaneously is also encompassed by the principles of the invention.

In some embodiments a virtual impactor for use in the invention has a generally circular cross section. In some cases this may taper in an outlet direction. For example the virtual impactor may comprise cylindrical body portion and a tapered and for example conical outlet portion.

Preferably, a virtual impactor of such configuration has a generally circular inlet and a generally circular outlet. Preferably, successive virtual impactors are directly linked to form a fluidly continuous structure. For example successive virtual impactors may be mounted in line linked with circular ducts to form a fluidly continuous structure.

In a practical arrangement, such circular cross section virtual impactors may be arrayed successively longitudinally, with generally longitudinal flow paths between them. Other arrangements may be considered without departing from the principles of the invention that the prefilter and concentrator modules comprise, and the prefilter and concentrator functions are provided by, successive inertial classifiers, for example being successive virtual impactors.

For example, inertial classifiers such as virtual impactors in a radial array, or hybrid of radial and longitudinal or other arrangement may be considered. Radial arrangements may confer advantages of compactness of design.

In an alternative arrangement successive virtual impactors comprising the prefilter virtual impactor and the concentrator virtual impactor(s) may form a planar array. Particularly preferably the successive virtual impactors making up the planar array are compactly associated together in a planar formation extending fluidly from an inlet into a prefilter module at the edge of the planar formation to an outlet from the concentrator module towards the centre of the planar formation. That is, the prefilter virtual impactor and the concentrator virtual impactor(s) are concentrically arranged.

Such planar formations may for example have a polygonal such as square or a circular shape.

In a preferred case a planar formation embodying the principles of the invention has a circular shape, wherein the successive virtual impactors making up the planar array are concentrically associated together in a planar formation extending fluidly from an inlet to a prefilter module at the edge of the circle to an outlet of the concentrator module towards the centre of the circle.

Successive virtual impactors may be sized to reflect the differential flow volumes, a downstream virtual impactor being smaller than an upstream one. This effect and feature are generally applicable but are particularly exploited in the embodiment where the prefilter virtual impactor and the concentrator virtual impactor(s) are concentrically arranged, as each successively downstream virtual impactor is necessarily smaller than an upstream one.

Each stage of virtual impactor, that is each of the prefilter virtual impactor and the one or more concentrator virtual impactor(s), may comprise multiple impactor units fluidly in parallel.

This principle may be applied to embodiments comprising planar formations as above described.

In such a case the planar formation comprises a plurality of sectors, for example fluidly discrete sectors, for example being identical sectors, extending fluidly from an inlet into a prefilter module at the edge of the planar formation to an outlet from the concentrator module towards the centre of the planar formation.

A planar formation may conveniently comprise four to twelve such sectors. In the case of a polygonal formation a single sector may extend inwardly from each side. In the case of a circular formation plural identical sectors are preferably provided angularly arrayed about the circumference.

More completely in a preferred embodiment, the concentrator system comprises a planar formation with a circular shape divided into a plurality of fluidly discrete sectors angularly arrayed about the circumference, each sector comprising, successively in fluid series, the prefilter module and the concentrator module, extending fluidly from an inlet into a prefilter module at the circumferential edge of the planar formation to an outlet from the concentrator module towards the centre of the circle. Optionally, there are four to twelve sectors which are preferably identical.

In embodiments above envisaged, each sector is typically envisaged as fluidly isolated, with each stage in a sector serially fluidly connected to a respective discrete series of other stages. Each stage in each sector may comprise an equivalent number of discrete fluidly parallel impactors with a serial fluid connection through the sectors. It will be understood that the invention also encompasses alternative arrangements in which different numbers of sectors and/or different numbers of impactors in a sector are provided at each stage, with more complex mixed serial and parallel fluid connections between them.

It should be understood that references herein to a sector of a planar formation, and in particular to a circular planar formation, do not necessarily require this to be a sector in the strict geometrical sense, but merely refer to one of multiple fluidly discrete portions of the circular planar formation that extend generally from a perimeter via a pair of side walls towards the centre. In this respect for example, sectors may have curved side walls.

In some embodiments the virtual impactor defines a plurality of flow channels. In some embodiments the virtual impactor defines a plurality of concentric arcuate flow channels. Such an arrangement may be advantageous in allowing successive virtual impactors to be linked by circular inlet/outlet ducts.

In some embodiments respective outlet channel portions of the plurality of flow channels are differentially structured and for example differentially tapered to create a more even distribution of flow. For example in the case where the virtual impactor defines a plurality of concentric arcuate flow channels these may be larger towards the outside.

In considering the collection of sample for further analysis, it may generally be useful for the apparatus further to include a collection module positioned fluidly to receive the output of the concentrator module and capture the particles into an aqueous liquid buffer.

Thus in a more complete aspect of the invention, a concentrator and collection system for the concentration of airborne and for example aerosolised particulate material and collection of the same into a suitable buffer solution comprises: optionally, an inlet module as herein described; a concentrator system as herein described; a collection module positioned fluidly to receive the output of the concentrator module and capture the particles into an aqueous liquid buffer.

In some embodiments of the system, the collection module comprises a wet cyclone.

Preferably, the collection module further comprises a misting chamber upstream of the wet-wall cyclone including a misting device configured to add water droplets to the output of the concentrator module. The misting device may include one or more nozzles. The misting device may include an ultrasonic transducer.

In accordance with the invention in a second aspect, a method for the collection of a sample of airborne and for example aerosolised particulate material comprises: receiving an inlet gas flow comprising particulate material; causing the gas flow to pass through a prefilter module comprising a first inertial classifier fluidly positioned to receive the inlet flow and configured to divide the inlet flow into a first outlet flow into which smaller particles tend to segregate differentially and a second outlet flow into which larger particles tend to segregate differentially;

causing the first outlet flow to pass through a second inertial classifier configured to divide the inlet flow into a first outlet flow into which smaller particles tend to segregate differentially and a second outlet flow into which larger particles tend to segregate differentially;

optionally causing the second outlet flow of the second inertial classifier to pass through at least one further inertial classifier fluidly positioned to receive an inlet flow from the and configured to divide the inlet flow into a first outlet flow into which smaller particles tend to segregate differentially and a second outlet flow into which larger particles tend to segregate differentially.

The method comprises outputting an outlet flow being the second outlet flow of the second or further inertial classifier as the case may be.

In some embodiments, each inertial classifier is a virtual impactor, and the method comprises:
receiving a gas flow comprising particulate material;
causing the gas flow to pass through a prefilter module comprising a first virtual impactor;
causing the major outlet flow of the first virtual impactor to pass through a second virtual impactor;
optionally causing the minor outlet flow of the first virtual impactor to pass through at least one further virtual impactor;
outputting the minor outlet flow of the second or further virtual impactor.

Further preferred features and refinements of the method will be understood by analogy with the description of operation of systems of the invention herein.

In preferred embodiments, the system and method for the collection of airborne particulate material is adapted to be performed in the field using portable apparatus, and in particular using vehicle mounted apparatus.

For example the system components are compactly associated with together in portable manner, and for example adapted to be mounted on a vehicle.

In further embodiments of the invention, a vehicle comprising such an apparatus is provided.

In other preferred embodiments, the system and method for the sampling and collection of airborne particulate material is adapted to be performed on an enclosed space using apparatus deployed in that space. This may be particular applicable for a space that has a partly recirculated atmosphere, and may be included in line with the recirculation system. For example the apparatus is deployed in an enclosed room, vehicle or aircraft to detect communicable airborne pathogens. Particularly advantageously in an aircraft this may be able to produce results over the course of a single journey alert of a threat before the plane lands.

The collector inlet of such a vehicle mounted apparatus may conveniently be shaped to cause air to flow into the prefilter module as the vehicle moves. A valve arrangement may be provided such that a constant air flow is maintained into the prefilter module across a range of vehicle speeds. Additionally or alternatively, suitable impeller means may be provided to draw air through the collector inlet and into the prefilter module.

The concept of the invention in an extended aspect comprises the use of a collection system or method as herein before described as part of a system or a method for the analysis of airborne and for example aerosolised particulate material.

In such an extended aspect, the system may comprise further modules, and the method may comprise further steps, in relation to such an analysis. Preferably, any, some or all of those further modules may be provided in line with the collection system of the first aspect of the invention, and for example as part of a portable and/or vehicle mounted system.

At its most complete a system in accordance with the principles of the invention may comprise in suitable fluid connection:

an inlet module as herein described;
a concentrator system as herein described;
a collection module as herein described;
analysis modules are herein described.

It will be appreciated that, subject to suitable design compatibility each such module may be used with various alternative embodiments of other modules. Unless the context clearly demands otherwise, the representation by way of example of an embodiment showing examples of such modules operating together does not require that the modules can only function in such association or that preferred features of any illustrated module are necessarily linked to preferred features of any other illustrated module alongside which it is presented.

The invention finds particular applicability to the collection and analysis of biological samples, and for example the collection genetic material and its analysis by sequencing.

BRIEF DESCRIPTION OF DRAWINGS

The invention will now be described by way of example only with reference to FIGS. 1 to 10 of the accompanying drawings, in which.

DETAILED DESCRIPTION

The concept of the invention in its broadest aspects is of a system and method for the collection of airborne and for example aerosolised particulate material, for example for the collection of an air sample. The concept of the invention in its extended aspect comprises the use of such an air sampling system and collection and method as part of a system and method for the analysis of such airborne particulate material.

An analysis system and method in accordance with an embodiment of the invention, and applying an air sampling and collection system and method in accordance with an embodiment of the invention, is described.

The invention finds particular applicability to the collection and optionally further the analysis of biological samples, and for example the collection of genetic material and optionally further the analysis of genetic material by sequencing, and the illustrated embodiment is configured for such collection and analysis by way of example.

Figure 1:
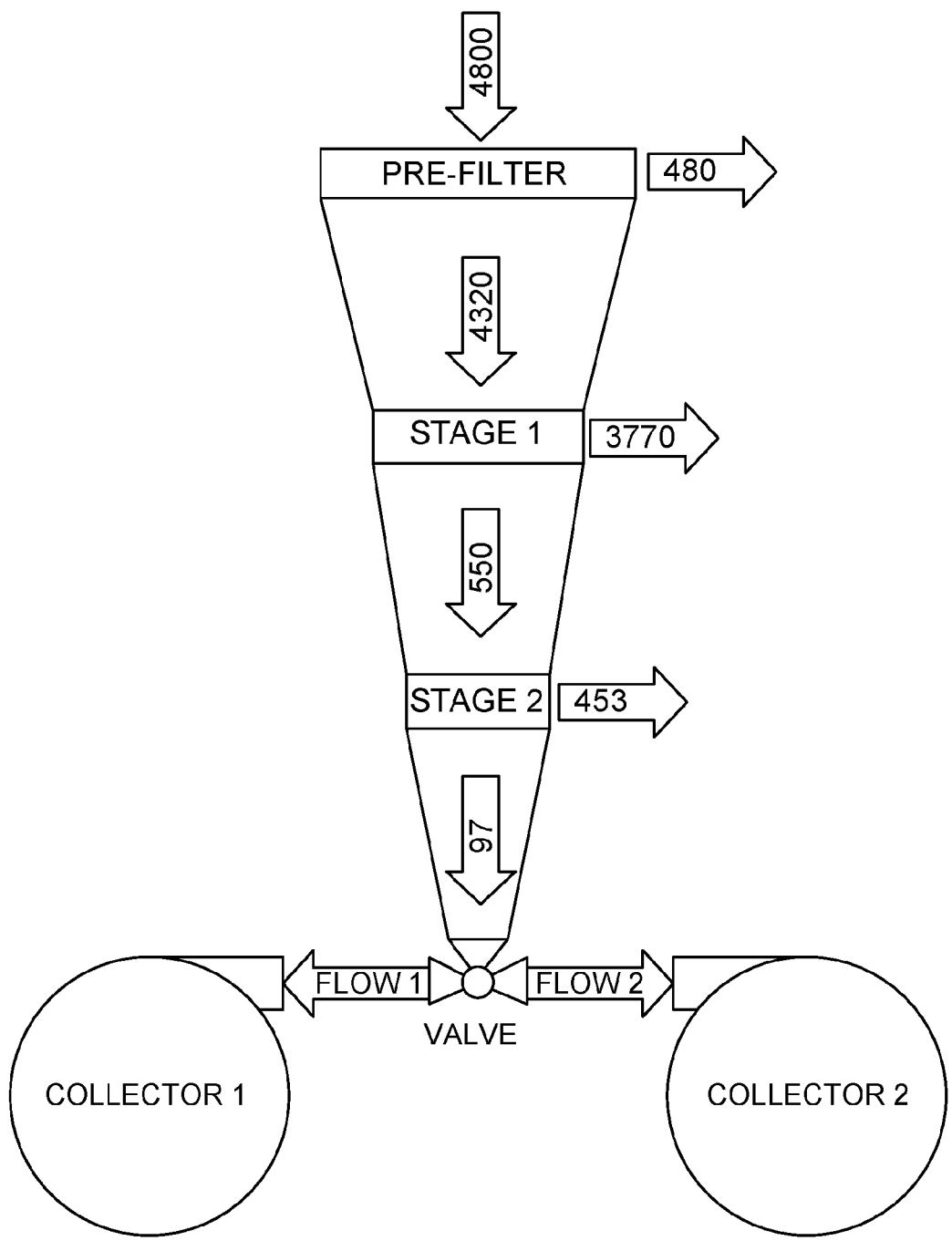
FIG. 1 is a schematic view of the principles of a sampling and collection system in accordance with an embodiment of the invention.

FIG. 1 is a schematic illustration of an air sampler and particulate collector that includes a concentrator system in accordance with an embodiment of the invention.

The air sampler in the illustrated embodiment may be considered as comprising three sub-systems each with a different function. These are an inlet, a pre-filter and particulate concentrator, and a collector.

The particle size range of interest in the illustrated embodiment is 0.4 µm to 10 µm, the respirable range. Therefore, the air sampler technology must retain particles within that range.

A suitable inlet arrangement may be provided through which air may be drawn into the illustrated prefilter and concentrator. The inlet may include a physical filter upstream of the prefilter module to remove larger particles from the system altogether before they are drawn into the prefilter module, In an example case, the inlet filter stops particles of size greater than 2 mm getting into the pre-filter.

The inlet sub-system captures and channels air from the sensor's local environment to the concentrator and collector. In the illustrated FIG. 1 representation, a simple unidirectional opening into the pre-filter is shown. In practice, more structured inlet modules providing for the particular dynamics of collection in particular scenarios, such as those discussed below, are likely to be more appropriate.

The inlet may be structured to stops large debris entering the system. For example a physical inlet filter may be used. In the FIG. 1 embodiment a simple cover is envisaged to be mounted above the pre-filter. Around its circumference is a 2 mm fine wire mesh to allow air to enter but not larger particulates.

Some embodiments may rely on forced airflow to collect particles. In that case a vacuum pump is used to pull air through the sampler to maintain a pressure differential between the pre-filter and outlet. The vacuum pump remains on the clean side of the collector such that the pump remains uncontaminated and no particles of interest are lost on impellor blades. In a case where a system is mounted on a vehicle or the like, when the vehicle is in motion, air can be collected by using a duct that uses the inherent air flow generated by the moving vehicle.

There is a desire to maximise on the amount of air that is sampled within a 30 s period. As the limit of detection (sensitivity) for the sensor is estimated to be 0.1 PPL (target) or 0.5 PPL (threshold), the more air that is sampled in any period should result in a higher recovery and yield of pathogenic microbes.

This is the particular role of the 'Pre-filter and Particle Concentrator' which in the embodiment uses the series of virtual impactors shown.

The pre-filter and concentrator system comprises three successively arrayed virtual impactors of a generally conventional design, respectively being a pre-filter stage comprising a first virtual impactor configured to receive airborne particulate material, a first concentrator stage comprising a second virtual impactor fluidly positioned to receive an inlet flow from the major outlet flow of the first virtual impactor, and a second concentrator stage comprising a further virtual impactor fluidly positioned to receive an inlet flow from the minor outlet flow of the second virtual impactor, and is configured to output the minor outlet flow of the concentrator module to a collector.

The main advantages of virtual impactors for particle sizing and concentration can be summarised as follows:

High collection efficiency for small particle sizes (bellow 1 mm) compared to conventional impactors and other sampling equipment.

Operation at low pressure drop, leading to lower running costs and power consumption.

Sharp cut-off characteristics (smaller amounts of particles around a cut-off point enter the next stage)

Using the same technology for both operations, (sizing particles and flow concentration), is most cost effective as the design and manufacturing is in principle the same. Successive progressively smaller stages are fluidly linked together in line.

The pre-filter and particulate concentrator sub-system serves to select a desired particle size range and concentrate the sample to increase the number of particles in a given volume of air. The pre-filter and particulate concentrator sub-module of the embodiment serves to select this particle size range and to concentrate it to a nominal design mode of concentrating particles within 2400 litres of air into 49 litres of air. This is intended to reduce the amount of time that is needed to collect enough genomic material to run the sequencer.

The pre-filter ensures that outside air enters the system and removes any particles above 10 µm. The concentrator increases the amount of biomolecules that are present in any given volume of air and the collector transfers them from their airborne phase into an aqueous phase. There are two collectors and they are used for 30 seconds every 60 seconds. After a 30 second collection period, a valve diverts air to the other collector and back again another 30 seconds later. This enables continuous collection of material.

In the example embodiment, the 'Pre-Filter' takes in contaminated air at a rate of 4800 l/min. The minor flow removes particles over 10 µm in size, at a flow rate of 480 l/min. The sub 10 µm particles continue onto the stage 1 concentrator at a flow rate of 4320 l/min.

Stage 1 of the concentrator receives the sub 10 µm particles from the 'Pre-Filter' stage. The major flow of stage 1, containing no particles flows at a rate of 3770 l/min. The sub 10 µm particles continue to 'Stage 2' at a flow rate of 550 l/min.

Stage 2 of the concentrator receives the sub 10 micron particles from 'Stage 1'. The major flow of stage 2, containing no particles, flows at a rate of 453 l/min. The sub 10 µm particles exit through the minor flow of stage 2, stage 2 at a flow rate of 97 l/min. The particles exiting Stage 2 are channelled to the collector.

The collector sub-system captures the particles into a liquid buffer so that they can be further processed downstream.

In the embodiment two collectors are alternately used. The collectors preferably use a wet cyclone technology to capture the concentrated sample. The main downsides of a wet cyclone collector is the susceptibility of the buffer to evaporate. This leads to higher levels of losses. Another potential issue and cause of loss is the re-aerosolization of buffer/biological material. As a consequence, the system that has been designed to use a scrubbing mist to increase capture efficiencies by having the droplets agglomerating onto the particulates to increase their effective size, making it easier for them to be captured. The mist may be injected into the collector. Additionally or alternatively a scrubber mist may be injected into the first stage flow concentration virtual impactor.

An additional benefit of using this technique is that the mist continually replenishes the collection buffer. Any residue that may usually build up on the collector walls is continually washed.

It will be appreciated that these advantages accrue, and the concept of a scrubber mist is therefore applicable, across the range of possible collector and concentrator technologies, and not merely in the embodiment illustrated in FIG. 1.

Figure 2:
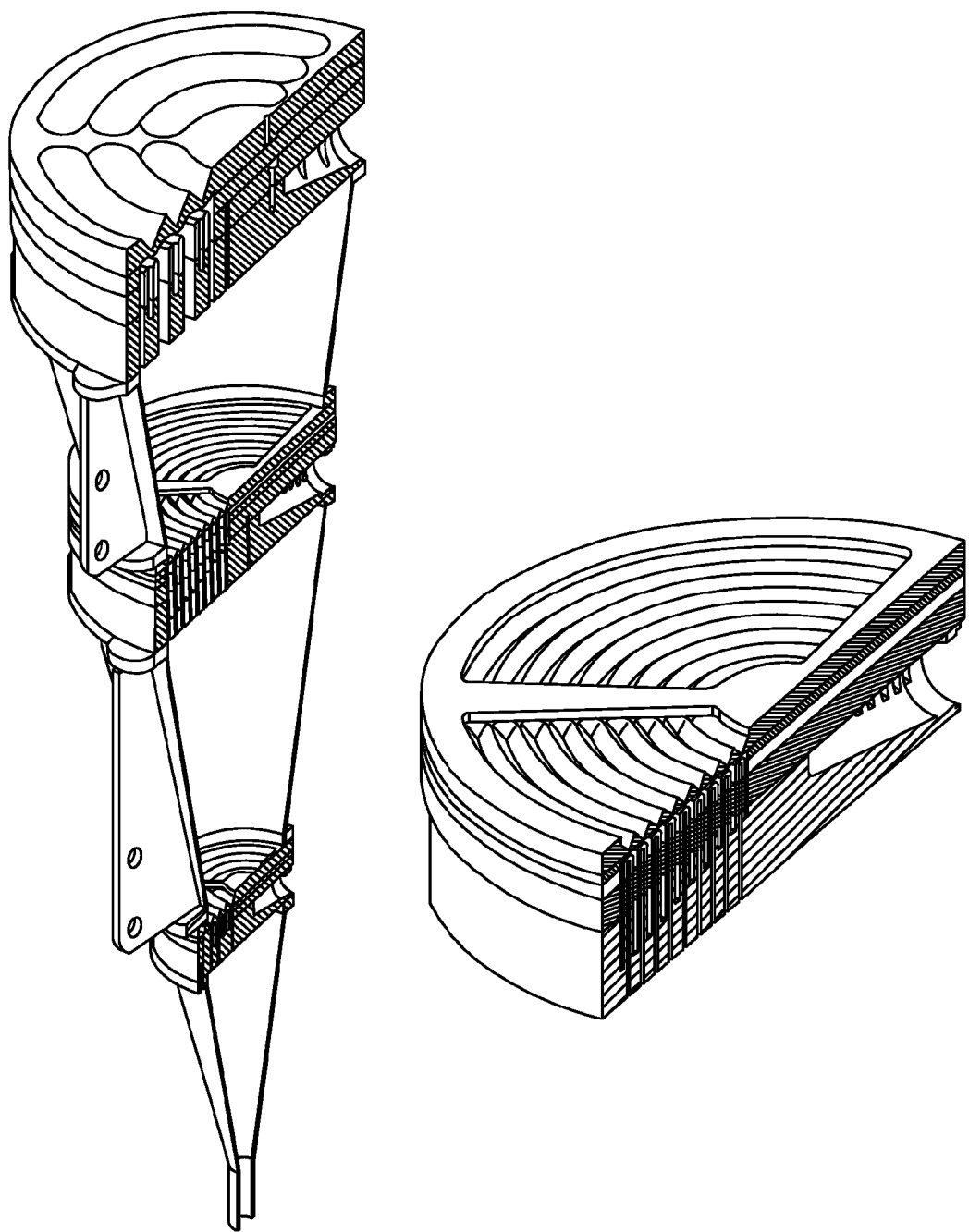
FIG. 2 shows in more detail a possible arrangement of pre-filter and concentrator virtual impactors for use with the sampling and collection system of FIG. 1.

FIG. 2 shows in more detail a possible arrangement of virtual impactor for use with the sampling and collection system of FIG. 1.

The design makes use of multiple flow channels comprising slits arranged in circular arcs instead of straight lines. The circular arrangement means that the impactor/particle filter can be mounted in-line within a circular duct. This avoids problems of changing from a circular inlet duct to a square impactor duct and back to a circular outlet. Moreover, with the pre-filter in the horizontal orientation and with it being circular, collection efficiencies may be less affected by the direction of air that passes over it.

The exhaust outlet channels are tapered according to the amount of air passing through them (i.e. bigger towards the outside of the device). The tapering of the outlets is intended to help obtain an even distribution of airspeed across the whole device, i.e. the same speed of air enters the outer slits as enters the inner slits.

Once collected in the wet cyclone of FIG. 1, the buffer is collected in a collection vessel before being pumped into the 'wet lab' process.

The concept of the invention in its extended aspect includes elements of the 'wet lab' process.

Example elements of this 'wet lab' process, and of subsequent data processing, include, without limitation, the following.

Cell Concentrator

Once the sample has been collected and the particulates are suspended in a liquid buffer, it is then injected into the first module of the pipeline, the cell concentrator. Given the volume of liquid that is required to agglomerate the particulates present in 2400 litres of air, nominally between 10 and 45 mL depending on the collection technology. Two main technologies were identified as suitable to be implemented into the biosensing system.

The first utilises filters of sub-micron pore size to retain biomolecules whilst letting water pass through. It is a very well established methodology, commonly used in laboratories.

The second uses Dielectrophoresis (DEP)-based cell capture, which utilises metal electrodes and electric fields to capture biomolecules. DEP is also very well established for specifically capturing biomolecules (i.e. one specific type out of a mixed population) suspended in a liquid medium, however it has not commonly been used or developed to handle a metagenomic sample to capture the entire range of molecules within it. Its attractiveness comes from being automation-friendly, its low cost of fabrication and utilisation, which doesn't require consumables or complex elution procedures, and that it can potentially be reused indefinitely. Furthermore, DEP can be fine-tuned to target bacteria, viruses, DNA and RNA, making implementation of a metagenomic pipeline theoretically easier.

Analysis of Liquid

Following the high concentration of biomolecules in the liquid buffer, there are numerous techniques to analyse for on the presence of microbes of interest. Such techniques can be used to report the presence, or lack of, of target items.

As it is collected, data may be reported to a central system for example over a distributed network. In preferred embodiments, the system and method of the invention is adapted to be performed in the field using portable apparatus, and in particular using vehicle mounted apparatus. Multiple such portable apparatus distributed across an area such as an urban area and connected to a control centre for example by a distributed network might provide an effective system for the real time sensing of airborne biohazards and other hazards.

A system to be used in such an application might for example have the system components compactly associated with together in portable manner, and for example adapted to be mounted on a vehicle.

An embodiment of a compact and portable sampler suitable for deployment in the field and for example for vehicle mounting is shown in FIG. 3 and a schematic of a more complete modular system is in FIG. 4.

The air sampler module 1 contains the following submodules: Air inlet; Pre-filter; Airborne particulate concentration; Collector. In use on a vehicle, the air sampler module is roof-mounted to maximise sample collection, and is connected via an umbilical connection to an analysis module 2 and an automation hardware data processing module 3. These last two may be protected in the centre of vehicle structure, convenient for maintenance access. A ruggedized chassis module may house the analysis cartridge and automation hardware and data processing module.

The analysis cartridge module contains the following hardware sub-modules: Cell concentrator; Bio sensor; Reagent storage.

The automation hardware and data processing module contains the following sub-modules: Fluidic hardware such as automated syringe pumps, valves and control gear Power supplies and other power management systems Computer and associated data collection devices In the embodiment illustrated in FIG. 2, the successive virtual impactors are arrayed vertically, with generally longitudinal flow paths between them. Other arrangements may be considered without departing from the principles of the invention that the prefilter and concentrator modules comprise, and the prefilter and concentrator functions are provided by, successive inertial classifiers, for example being successive virtual impactors. For example, inertial classifiers in a radial array, or hybrid of radial and longitudinal or other arrangement may be considered.

Moreover, in the embodiment illustrated in FIG. 2, the successive virtual impactors are illustrated as clearly discrete modules performing the respective prefilter and concentrator stage 1 and stage 2 functions. A single compound module adapted to include multiple stages is also encompassed by the principles of the invention.

Alternative embodiments with adaptations as above for possible more compact operation are shown in FIGS. 5 and 6.

FIG. 5 shows an example of such a compact concentrator system.

Fundamentally, the fluid processes in this compact concentrator system, and fluid processes and structures in the successive impactor stages, are equivalent to those of the more conventional virtual impactors illustrated in FIG. 2. As in FIG. 2 the system has a prefilter stage comprising a first virtual impactor configured to receive airborne particulate material, a first concentrator stage comprising a second virtual impactor fluidly positioned to receive an inlet flow from the major outlet flow of the first virtual impactor, and a second concentrator stage comprising a further virtual impactor fluidly positioned to receive an inlet flow from the minor outlet flow of the second virtual impactor, and is configured to output the minor outlet flow of the concentrator module to a collector.

However the example compact concentrator system illustrates a number of general design principles each of which may alone or in combination be advantageous in a pre-filter and concentrator of the invention in some operational situations, for example where compactness is required and/or for deployment in the field, including:

- the development of a planar array of successive impactors;
- the combination of the pre-filter and inertial classifier function into a single compact pre-filter and concentrator unit or segment;
- the provision of a plurality of these units or segments fluidly in parallel;
- the provision of a plurality of these units or segments arranged compactly together radially.
- the provision of a system with 360 degree inlet flow.

As can be seen in FIG. 5A the pre-filter and concentrator formation is conformed as a planar circular disc with 12 fluidly discrete units comprising arrangements of prefilter, first concentrator and second concentrator, each comprising a 30 degree segment of the disc. The virtual impactors making up the pre-filter stage are outermost, the virtual impactors making up the first concentrator stage are next inward, and the virtual impactors making up the second concentrator stage are closest to the centre.

The discs are themselves a sandwich of three layers to create the channels that route the exhausts away from each individual virtual impactor. The wall sections help reduce the turbulence in the flow between the stages as well as provide a means of getting the exhaust air from the top of the concentrator ring to the bottom.

FIG. 5B shows the flow pattern through an individual segment and through the virtual impactors making up the successive stages therein.

In the illustrated embodiment, the segment fluidly discrete, with the prefilter stage fluidly connected in series to first and second successive concentrator stages. Other more complex arrangements could be readily envisaged without departing from the principles of the invention in which respective stages are divided different numbers of sectors and/or different numbers of impactors in a sector are provided at each stage, with more complex mixed serial and parallel fluid connections between them.

FIGS. 6 and 7 show in simple schematic alternative geometries of compact planar pre-filter and concentrator formations again made up of multiple pre-filter and concentrator units or segments and also how the formation may be incorporated into a more complete collection system.

FIG. 6 shows an alternative square planar geometry pre-filter and concentrator formation, with the illustrated embodiment containing four units or segments covering four quadrants of the sampler, in a suitable enclosure.

This embodiment contains enclosure 21, four impactors 22, manifolds between the impactors 23 and a central collector 24, fans and ducting 25 and a pumping mechanism 26.

Other preferred features or advantages offered by these more compact arrangements embodiment include:

- the inlet is built into the enclosure;
- the arrangement maximises space-air collection to volume ratio;

manifolds separate each impactor, serving both sides;
enables removal of much ducting, valving and throttling to balance flow;
the size of the overall unit may be reduced significantly.

Figure 7:
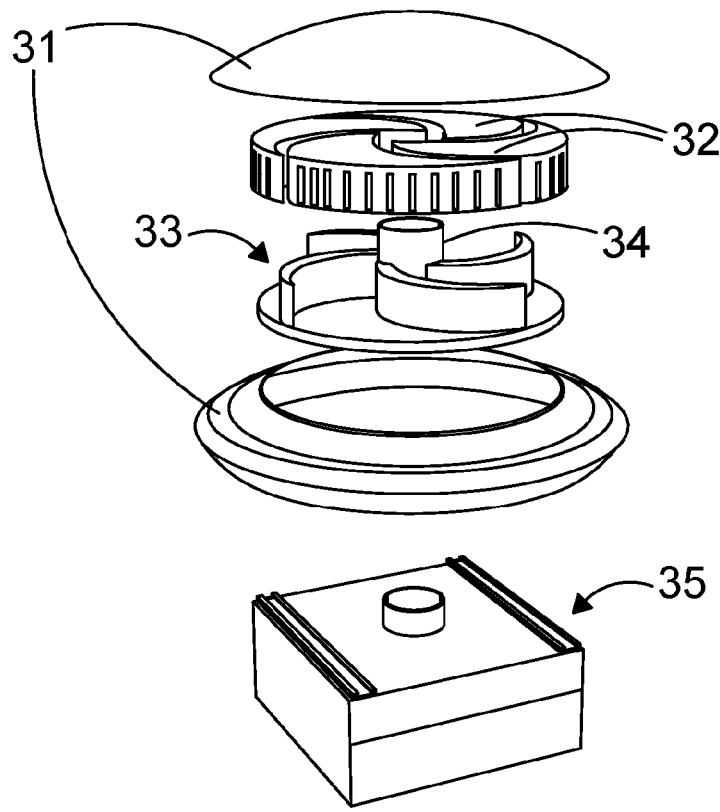

FIG. 7 illustrates schematically some possible further alternative features for such a compact sampler.

Figure 6:
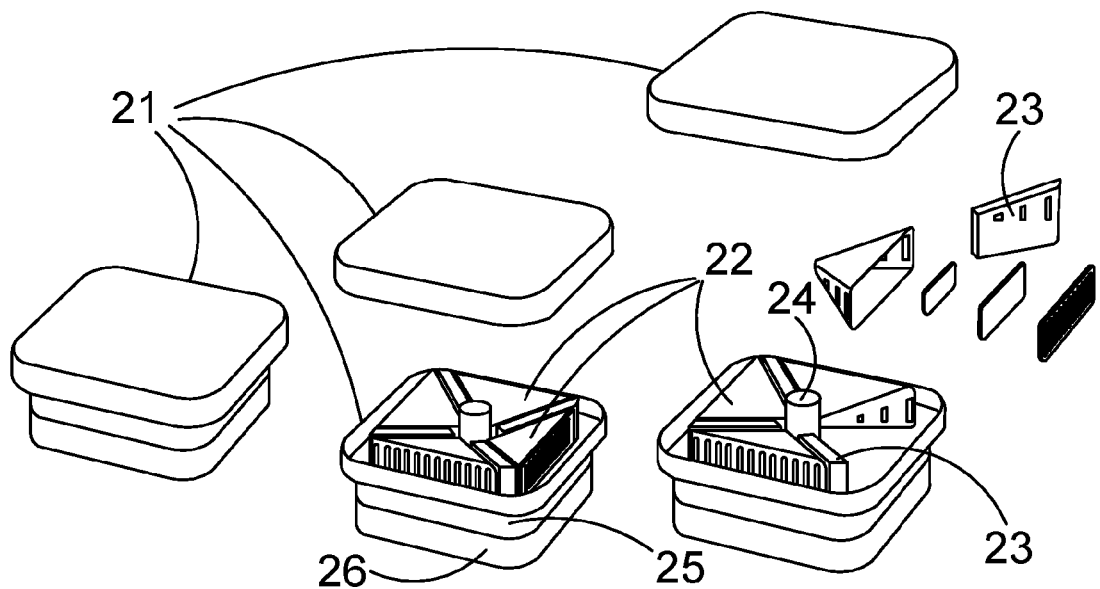
FIGS. 6 and 7 show alternative compact planar formation geometries of virtual impactors suitable for use with a sampling and collection system.

The key design difference that can be seen in the FIG. 6 embodiment is that the impactors 32 are curved and placed inside a circular inlet and enclosure 31. The individual impactors are separated by suitably curved manifolds 33, with no dead space in between. The impactors and manifolds allow collection of the air at a central, single collector 34 which can then output to the latter stages of the air sampler. The remaining downstream components of the sampler are in the housing 35.

Advantages of the curved impactor design include that the air sees the same cross sectional area (the system is omni-directional) and that a large surface area is created in a compact design.

Figure 3:
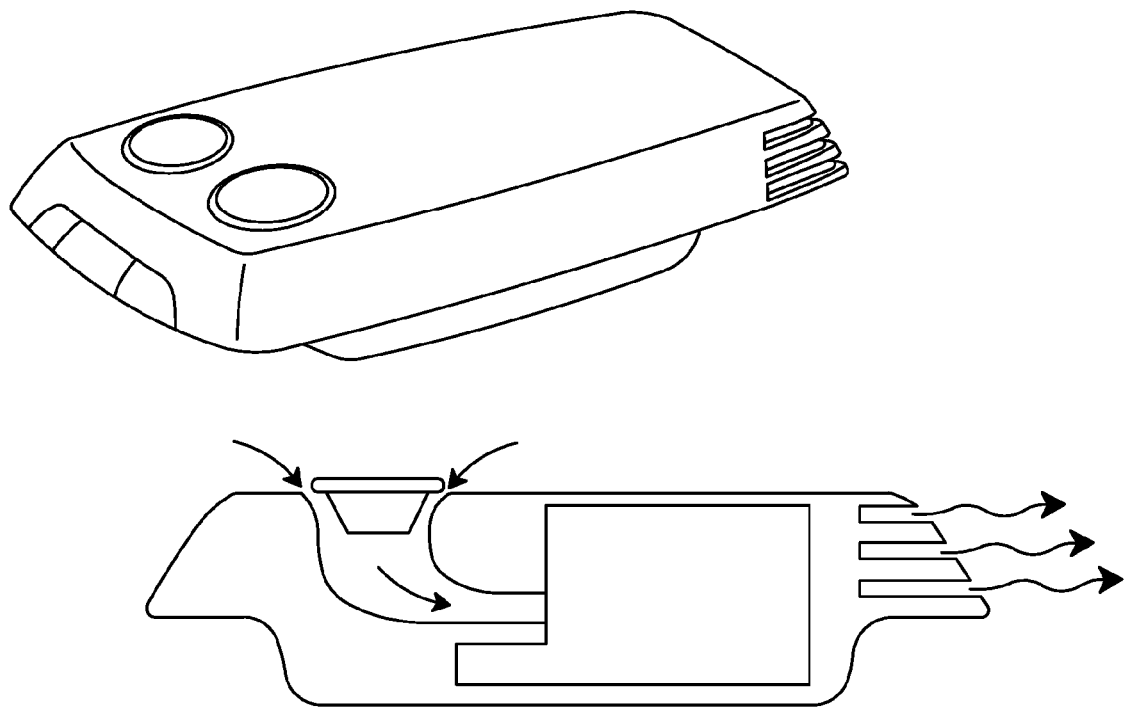
FIGS. 3 and 4 illustrate the adaptation of a system in accordance with the invention for deployment in the field, for example mounted on a vehicle.
Figure 4:
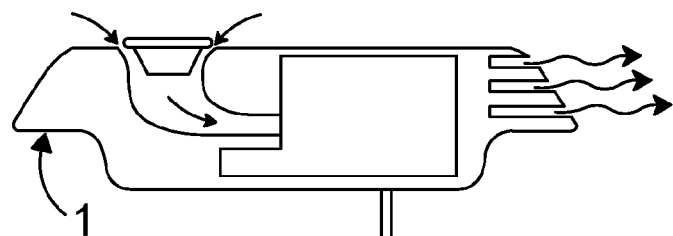
Figure 4:
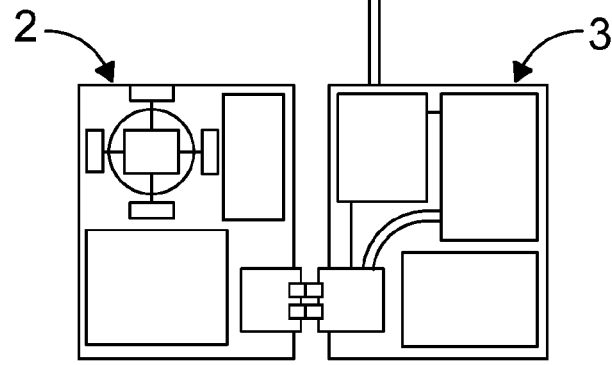
Figure 5A:
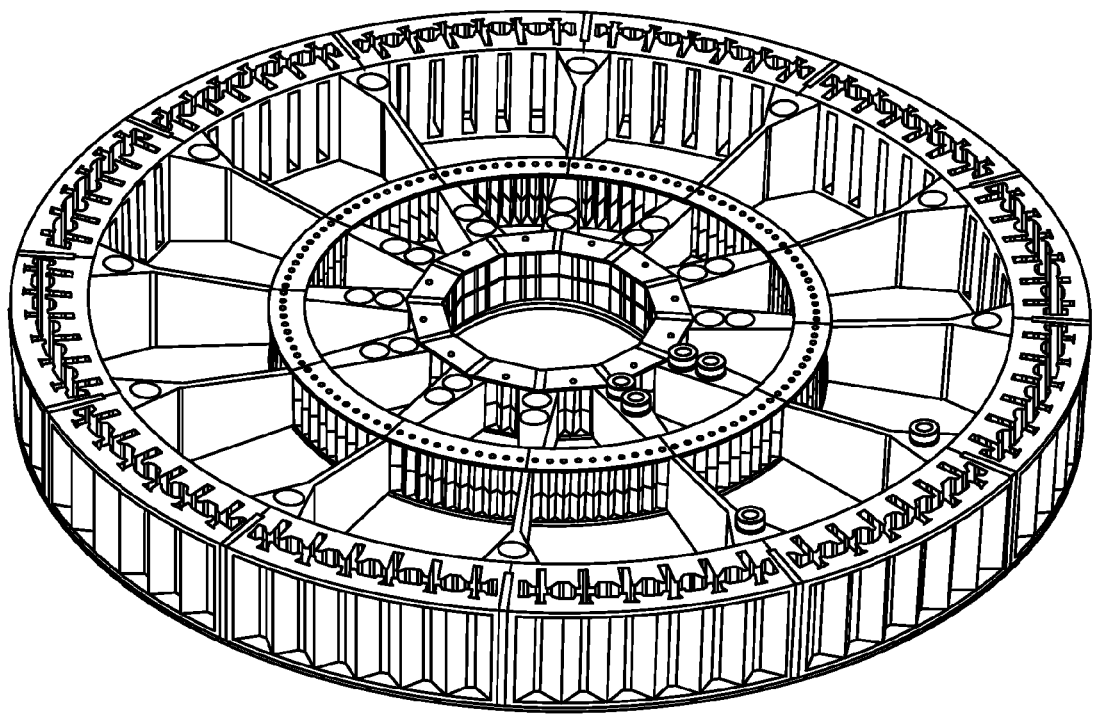
FIG. 5 shows a planar pre-filter and concentrator formation with an alternative arrangement of virtual impactors suitable for use in a sampling and collection system.
Figure 5B:
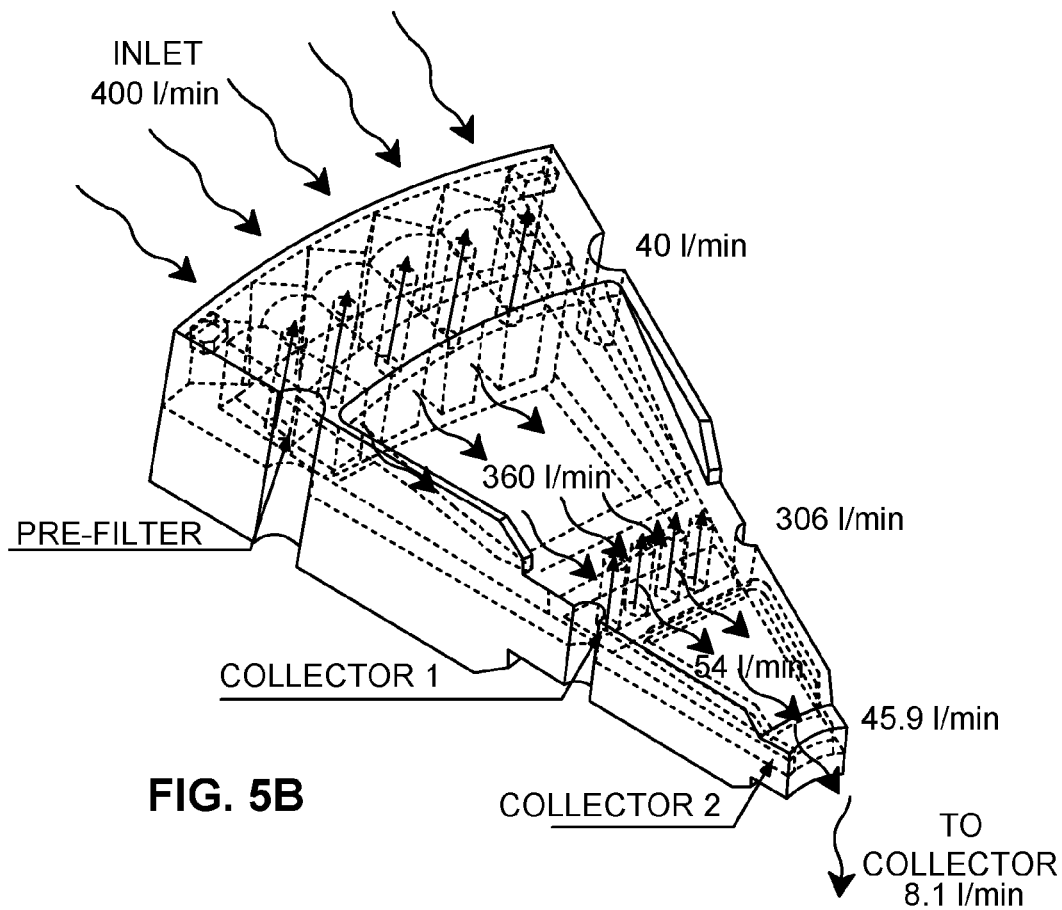
Figure 8:
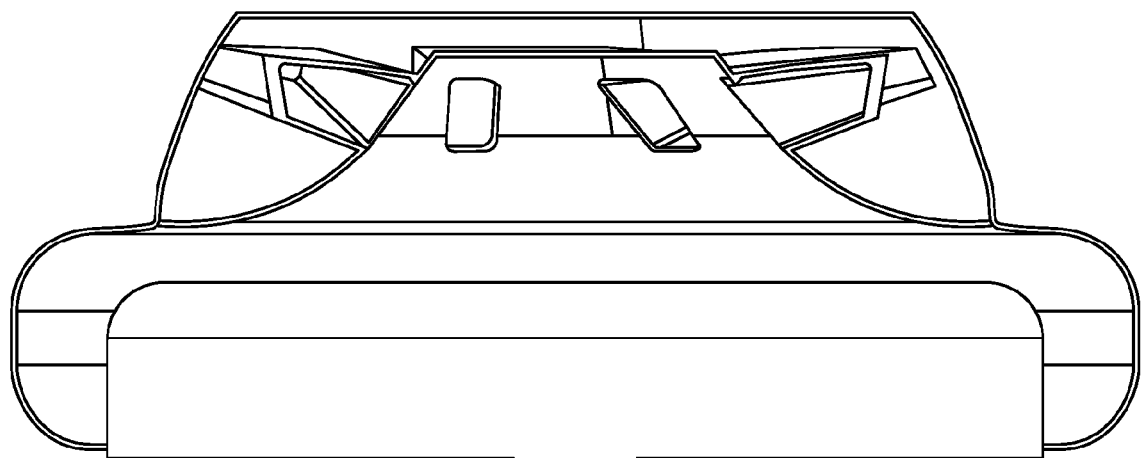
FIGS. 8 to 10 show an inlet module particularly adapted for use on a moving vehicle.
Figure 9:
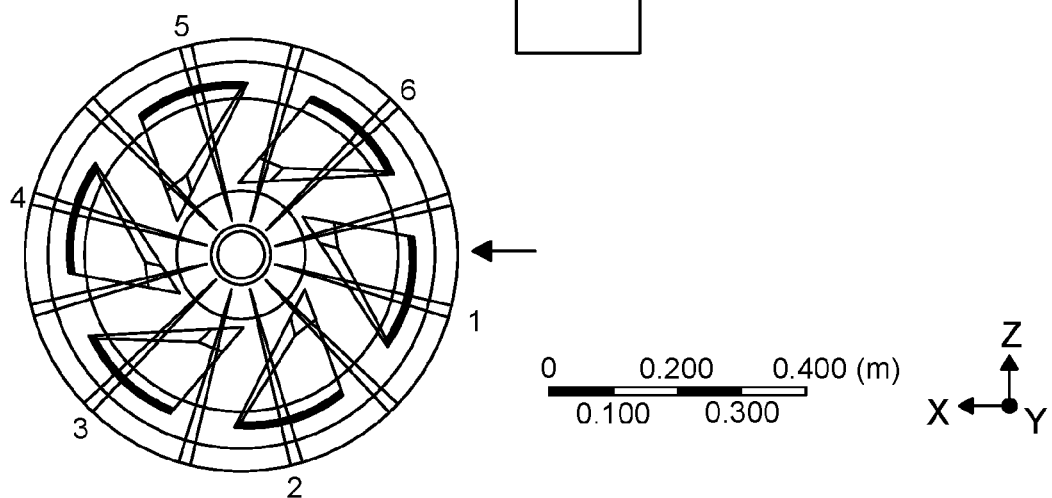
Figure 10:
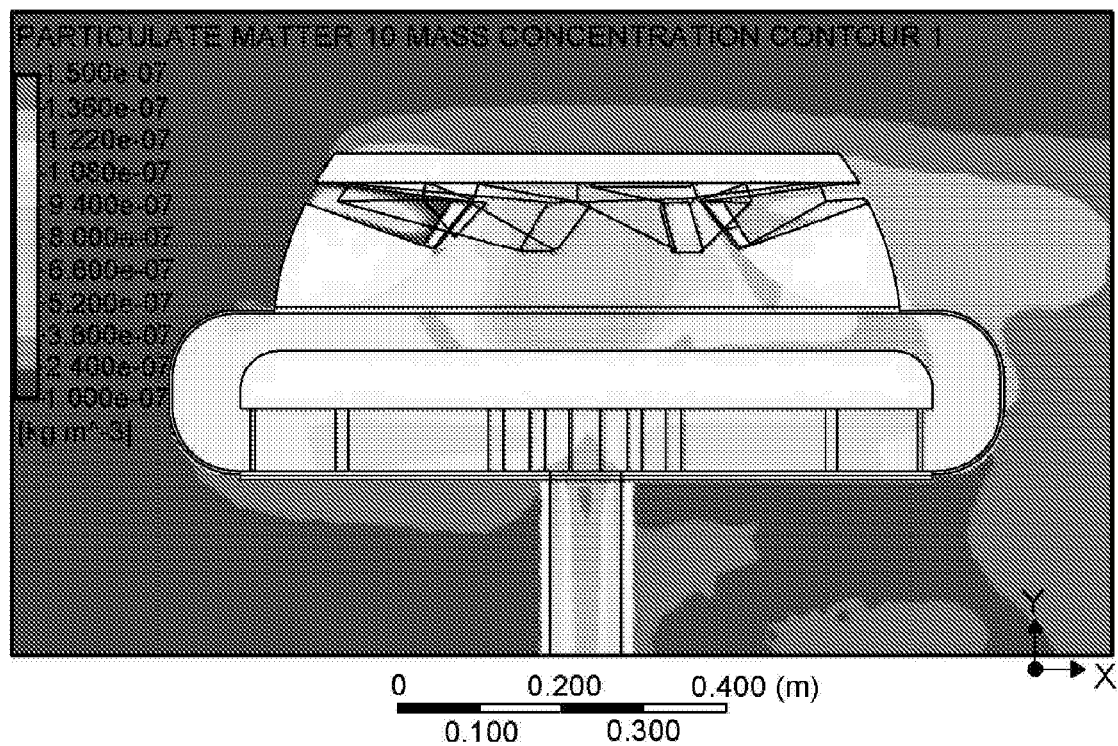
Figure 11:
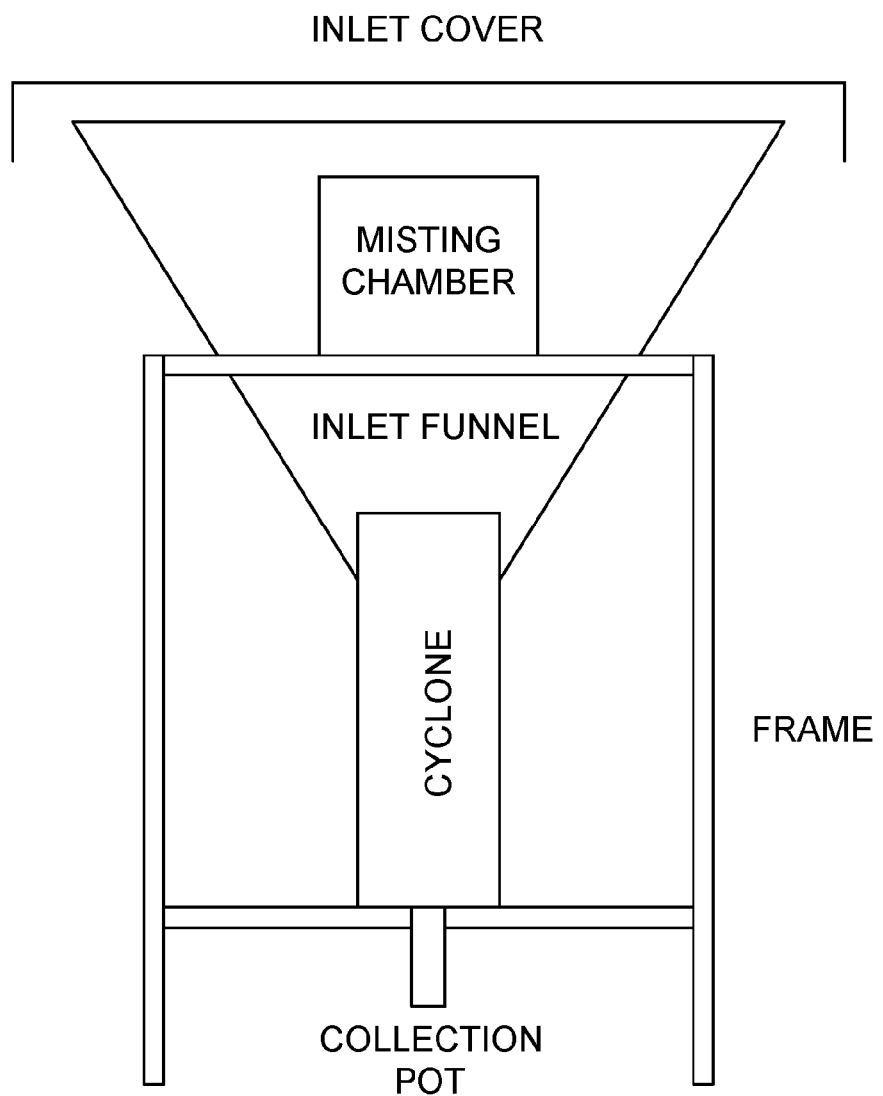
FIG. 11 shows an example collection module.

The simple inlet presented in FIG. 3 is not necessarily optimized for use in all scenarios on a moving vehicle, and alternative optimizations are discussed with reference to FIGS. 8 to 10.

The principal challenge is to make sure that there is no pressure differential into the air sampler with differing wind speeds/directions.

Significant challenges have had to be overcome to keep the full 360-degree collection capability as well as direct as much of the $PM_{10}$ particle matter into the air collector without significant particulate deposits on the inside of the inlet. Initial investigations showed that a simple dome with a slit was capable of preventing the larger particulate matter from being drawn into the air collector without affecting the transfer of $PM_{10}$. However, when an airflow was introduced representative of the airflow over a moving vehicle, the simulation showed that the airflow caused a significant pressure difference between the leading and trailing faces of the collector. The pressure difference was significant enough to over-drive the concentrators on the leading face and suck air out through the collectors on the trailing faces. This approach is not always capable of normalizing the airflow around the air collector sufficiently to allow it to function correctly.

An alternative inlet module design giving improved functionality having regard to such configurations, and particularly adapted for use with the example compact unit of FIG. 5, is shown in FIGS. 8 and 9.

The inlet uses six inlet scoops to create a tangential air flow around the outside of the air collector to normalise the flow through all twelve of the pre-filter and concentrator segments. FIG. 8 shows a cross section view of the new inlet design with the six scoops located in the top of the dome over the air collector (housing only shown) with an aerodynamic cowling to cover the exhaust pipes.

The inlet scoops produce a cyclic airflow in the chamber above the air collector which moves down and out to the air collector inlets. This approach both normalises the pressure distribution around the air collector as well as reduces turbulence and particle deposition on the air collector and the inside of the inlet. In a stationary setting the air collector draws the air in through all six of the inlet scoops and collects a true full 360-degree sample. As the airflow around the inlet is increased the air that makes it into the inlet becomes increasingly biased towards the scoops on the leading face, but the air collector is still able to function correctly and sample the air inside the inlet using all segments.

FIG. 9 shows the directional bias created by the airflow around the inlet. It can be seen that at low speeds (≤4 m/s) there is a maximum of 26% reduction and 23% increase in the flow through the scoops compared to when stationary. At these low speeds the inlet is more biased towards the left with a lower mass flow rate through the 2 right scoops. Despite this bias it is still capable of collecting a 360-degree sample with 26% of the sample coming from the right (scoops 2 and 3) and 39% coming from the left (scoops 5 and 6). At higher speeds 8 m/s) the bias is more towards the front left and rear with the maximum mass flow rate reduction of 56% (compared to stationary) being observed on the right. At these higher speeds the inlet still collects from all directions with 19% of the sample coming from the right and 36% from the left. At high speed (14 m/s) the sample is biased to the front and rear as air has just started to be drawn out of the side scoops. Despite the reversed flow in two of the scoops the inlet still collects 9% of the sample from the right and 21% from the left. It is possible that changing the direction of the airflow by about 15-degrees may significantly change the degree of the directional bias however this needs further investigation. The current design favours the left-hand side when presented with an airflow however this could be used to reduce the amount of vehicle emissions collected. By changing the direction of the scoops this bias could be swapped to the right-hand side (for left hand drive vehicles). On busy streets a larger proportion of the sample could be collected from the side with less traffic resulting in less deposition of material and less non-biological matter in the sample.

Investigations into particle transfer efficiency have shown that in stationary conditions the current design should achieve a 96.1% transfer efficiency for all $PM_{10}$ particulate, which increases up to 99.5% for $PM_{25}$, from the environment to the air collector. As the airflow is increased to 14 m/s (31 miles per hour) the $PM_{10}$ transfer efficiency drops to 63.4% and the $PM_{2.5}$ transfer efficiency drops to 88.5%.

It is important to note that the transfer efficiency is from the surrounding environment external to the inlet to the inlet of the prefilter of the air collector. This does not mean that all of the $PM_{10}$ particles that do not make it into the air collector are deposited inside the inlet. It is far more likely that the majority of the lost particles do not enter the inlet scoops as they have a small stokes number so are caught up in the flow around the outside of the inlet dome. FIG. 10 shows CFD results of $PM_{10}$ mass concentration in an 8 m/s airflow from left to right.

Thus, the inlet arrangement of the example design illustrated with respect to FIGS. 8 to 10 is admirably adapted for use in a system in accordance with the invention deployed on a moving vehicle, in particular dealing with the problems posed by pressure differential into the air sampler with differing wind speeds/directions, and the desire to achieve a 360-degree collection capability as well as direct as much of the $PM_{10}$ particle matter into the air collector without significant particulate deposits on the inside of the inlet.

FIG. 11 shows in more detail a possible arrangement of collector for use with the sampling and collection system of FIG. 1 or any other suitably compatible sampling and collection system in accordance with the principles of the invention.

The example collector comprises a misting chamber and a wet-wall cyclone.

The misting chamber is used to create water droplets in the air stream. The embodiment uses an ultrasonic mister. The ultrasonic mister is found to produce a more uniform mist of water droplets with a sufficiently small stokes number that they follow the airflow. An inlet funnel is used upstream of the misting chamber to reduce the amount of water build up in the ducting to the cyclone inlets by reducing the likelihood of the droplets settling or impacting on the walls of the ducting. For use outdoors, a cover for the inlet is added to prevent large particulate matter from entering the system as well as any other debris such as leaves, and insects.

The ultrasonic mister sits in the misting chamber and is submerged in water. When powered the mister produces water droplets in the range of 2 μm to 15 μm which drift out of vent holes in the side of the misting chamber into the inlet funnel. Once in the inlet funnel the water droplets mix with the air that is being drawn through the apparatus and are drawn into the cyclone with the airflow through the inlet funnel.

A vacuum pump is used to draw the air through the apparatus with a flow meter and a flow control valve to allow the flow rate to be set to 98l/min which the cyclone was designed to operate at. The air is drawn into the apparatus through the gap between the inlet cover and the top of the inlet funnel. The main function of the inlet cover is to prevent unwanted material from entering the inlet funnel, it will also prevent larger particulate matter such as dust from entering the apparatus as it will not be able to follow the airstream due to the low velocity of the airflow and the larger mass of the particles producing a large stokes number.

The air is drawn through the inlet funnel, where it mixes with the water droplets from the misting chamber, and into the cyclone. The air is drawn out of the cyclone and through the catch pot where again due to the size of the water droplets they impact on the bottom of the catch pot and are collected. The air is then drawn on through the flow control valve, flow meter and onto the vacuum pump where it is vented back to atmosphere. The liquid with any captured particulate matter that is separated from the airflow drains out of the bottom of the cyclone and collects in the collection pot.

The particulate sample from a suitably compatible prefilter and concentrator system such as one of the examples illustrated is thus effectively collected into an aqueous medium ready for further processing and for example analysis. This may for example be via an in-line system such as described by way of example above. Thus, the collector of FIG. 11 is an example of a collection module suitable for use with and fluidly connected to a suitably compatible prefilter and concentrator system and/or a suitably compatible analysis system.

The invention claimed is:

1. A particle concentrator system for the concentration of particulate material comprising:

- a prefilter module comprising a first inertial classifier configured to receive an inlet gas flow comprising particulate material and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at a desired maximum particle size;
- a concentrator module comprising a second inertial classifier fluidly positioned to receive an inlet flow from the first outlet flow of the first inertial classifier and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at or below a desired minimum particle size, wherein the first inertial classifier and the second inertial classifier are within a planar circular disc;

an outlet to output the second outlet flow.

2. A particle concentrator system in accordance with claim 1 wherein the concentrator module comprises at least one further inertial classifier, each such further inertial classifier successively fluidly positioned to receive an inlet flow from the second outlet flow of the immediately preceding inertial classifier and configured to divide the inlet flow into a first outlet flow into which particles smaller than a predetermined cut point size tend to segregate differentially and a second outlet flow into which particles larger than a predetermined cut point size tend to segregate differentially, the predetermined cut point size being selected to be at or below a desired minimum particle size; and an outlet to output the second outlet flow of the concentrator module.

3. A particle concentrator system in accordance with claim 2 wherein the concentrator module comprises exactly two inertial classifiers fluidly in series.

4. A particle concentrator system in accordance with claim 1 comprising a pre-filter module comprising a first inertial classifier stage and a concentrator module with at least a second inertial classifier stage and at least one further inertial classifier stage, wherein each stage may comprise multiple discrete fluidly parallel inertial classifiers.

5. A particle concentrator system in accordance with claim 1 wherein each inertial classifier is an impactor.

6. A particle concentrator system in accordance with claim 5 wherein each inertial classifier is a virtual impactor.

7. A particle concentrator system in accordance with claim 6 comprising:

- a prefilter module comprising a first virtual impactor configured to receive a gas flow comprising particulate material;
- a concentrator module comprising a second virtual impactor fluidly positioned to receive an inlet flow from the first outlet flow of the first virtual impactor; and at least one further virtual impactor, each such further virtual impactor successively fluidly positioned to receive an inlet flow from the second outlet flow of the immediately preceding virtual impactor; and an outlet to output the second outlet flow of the concentrator module.

8. A particle concentrator system in accordance with claim 7 comprising:

- a prefilter module comprising a first virtual impactor configured to receive a gas flow comprising particulate material and for example fluidly positioned to receive an inlet flow from the sampler inlet and configured to divide the inlet flow into a first, major outlet flow into which smaller particles tend to segregate differentially and a second, minor outlet flow into which larger particles tend to segregate differentially;
- a concentrator module comprising:
- a second virtual impactor fluidly positioned to receive an inlet flow from the first, major outlet flow of the first virtual impactor and configured to divide the inlet flow into a first, major outlet flow into which smaller particles tend to segregate differentially and a second, minor outlet flow into which larger particles tend to segregate differentially;
- a further virtual impactor fluidly positioned to receive an inlet flow from the second, minor outlet flow of the second virtual impactor and configured to divide the inlet flow into a first, major outlet flow into which smaller particles tend to segregate differentially and a second, minor outlet flow into which larger particles tend to segregate differentially;

an outlet to output the second, minor outlet flow of the concentrator module.

9. A particle concentrator system in accordance with claim 6 wherein successive virtual impactors comprising the prefilter virtual impactor and the concentrator virtual impactor(s) form a planar array.

10. A particle concentrator system in accordance with claim 9 wherein the successive virtual impactors making up the planar array are compactly associated together in a planar formation extending fluidly from an inlet into a prefilter module at the edge of the planar formation to an outlet from the concentrator module towards the centre of the planar formation.

11. A particle concentrator system in accordance with claim 10 wherein the planar formation has a circular shape, wherein the successive virtual impactors making up the planar array are concentrically associated together in a planar formation extending fluidly from an inlet to a prefilter module at the edge of the circle to an outlet of the concentrator module towards the centre of the circle.

12. A particle concentrator system in accordance with claim 10 wherein the planar formation comprises a plurality of sectors extending fluidly from an inlet into a prefilter module at the edge of the planar formation to an outlet from the concentrator module towards the centre of the planar formation.

13. A particle concentrator system in accordance with claim 1 wherein the concentrator system comprises a planar formation with a circular shape divided into a plurality of fluidly discrete sectors angularly arrayed about the circumference, each sector comprising, successively in fluid series, the prefilter module and the concentrator module, extending fluidly from an inlet into a prefilter module at the circumferential edge of the planar formation to an outlet from the concentrator module towards the centre of the circle.

14. A particle concentrator system in accordance with claim 1 wherein successive inertial classifiers are sized to reflect the differential flow volumes, a downstream classifier being smaller than an upstream one.

15. A gas sampler system for the collection and concentration of particulate material comprising:

a sampler inlet for example provided in a sampler inlet module to receive a gas flow comprising particulate material;

a particle concentrator system in accordance with claim 1;

wherein the prefilter module is fluidly positioned to receive an inlet flow from the sampler inlet.

16. A gas sampler, concentrator and collection system for the concentration of particulate material and collection of the same into a suitable buffer solution comprises:

a system in accordance with claim 15;

a collection module positioned fluidly to receive the output of the concentrator module and capture the particles into an aqueous liquid buffer.

17. A system in accordance with claim 16 wherein the collection module comprises a wet-wall cyclone.

18. A system in accordance with claim 17 wherein the collection module further comprises a misting chamber upstream of the wet-wall cyclone including a misting device configured to add water droplets to the output of the concentrator module.

19. A method for the collection of a sample of particulate material comprising:

receiving an inlet gas flow comprising particulate material;

causing the gas flow to pass through a prefilter module comprising a first inertial classifier fluidly positioned to receive the inlet flow and configured to divide the inlet flow into a first outlet flow into which smaller particles tend to segregate differentially and a second outlet flow into which larger particles tend to segregate differentially;

causing the first outlet flow to pass through a second inertial classifier configured to divide the inlet flow into a first outlet flow into which smaller particles tend to segregate differentially and a second outlet flow into which larger particles tend to segregate differentially; wherein the first intertial classifier and the second intertial classifier are within a planar circular disc;

optionally causing the second outlet flow of the second inertial classifier to pass through at least one further inertial classifier fluidly positioned to receive an inlet flow from the and configured to divide the inlet flow into a first outlet flow into which smaller particles tend to segregate differentially and a second outlet flow into which larger particles tend to segregate differentially.

20. The method of claim 19 wherein each inertial classifier is a virtual impactor, and the method comprises:

receiving a gas flow comprising particulate material;

causing the gas flow to pass through a prefilter module comprising a first virtual impactor;

causing the first outlet flow of the first virtual impactor to pass through a second virtual impactor;

causing the second outlet flow of the first virtual impactor to pass through at least one further virtual impactor;

outputting the minor outlet flow of the second or further virtual impactor.

* * * * *